3,457,087
METHOD OF PROCESSING OF PEANUTS
Herbert O. Renner, deceased, late of Des Plaines, Ill., by Olga F. Renner and Gerd Otto Renner, heirs, both of 332 N. Wolf Road, Des Plaines, Ill. 60016, and Rolf Herbert Renner, heir, 2201 Baker St., San Francisco, Calif. 94115
No Drawing. Filed June 30, 1967, Ser. No. 650,553
Int. Cl. A23l 1/36; A23b 9/00
U.S. Cl. 99—126
11 Claims

ABSTRACT OF THE DISCLOSURE

Shelled peanuts are heated to a temperature above the boiling point of water then contacted by an edible liquid to cool the peanuts below the temperature of boiling water to eliminate surface blemishes or "spotting" of the peanut.

---

This invention relates to improvements in processing nuts and more specifically relates to a method for eliminating "spotting" of the surface of nuts.

In the processing of salted nuts it is usullay necessary to subject the nuts to heat for one or more of the following procedures: deskinning, blanching, or roasting. These heating steps tend to aggravate a "spotting" problem which occurs on some nuts during drying at ordinary temperatures. Peanuts, in particular, are subject to wide variations in surface appearance. The undesirable "spottiness" which unpredictably appears in commercial peanut processing operations is characterized by unsightly white spots, whitish blemishes, blotches, and/or blisters which are emphasized by the brown background color of roasted peanuts. Due to its unpredictability, this "spottiness problem" plays havoc with production schedules and can result in severe increases in production costs or loss of sales appeal in the final product.

To a certain extent spotting problems are believed to be caused by uneven oil distribution in the kernels resulting from natural growth defects and the harvesting, dehulling, shipping, and storage methods used by peanut growers and jobbers. These practices cannot be effectively controlled by the peanut processor. For this reason a method of controlling "spottiness" which is usable during processing operations is very desirable.

Accordingly, it is an object of this invention to provide a novel method for producing roasted peanuts free from objectionable whitish surface blemishes regardless of the characteristics of the peanut raw material.

Another object of the invention is to produce nuts free from "spottiness" which also have an increased shelf-life and a longer lasting flavor.

Another object of the invention is to impart to peanuts an optimal degree of crispness for chewability without creating "spottiness."

In general, the process of the invention involves heating shelled peanuts to a temperature above the boiling point of water and then quenching the heated peanuts by contact with an edible liquid to cool the peanuts to a temperature below the boiling point of water. This treatment eliminates objectionable white spotting of peanuts and possesses other processing advantages.

The heating step of the invention usually is performed during a heating step in normal processing operations such as blanching or preferably roasting by either deep fat frying or dry-roasting. However, it is not necessary that the heating step coincide with one of the previously practiced processing steps involving application of heat to the peanut.

During the heating step the temperature of the peanuts is raised above the boiling point of water in the processing zone. In blanching peanuts temperature from about 214° to about 250° F. are utilized; in dry-roasting the temperatures achieved on the outer portion of the peanut range from about 230° to about 300° F. and in deep fat roasting the corresponding peanut surface temperatures range from about 257° to about 375° F.

During the heating of peanuts above the boiling point of water, steam is formed within the peanut tissue and due to rising pressure is forced through the surface thereof. Air spaces result if the peanuts are cooled in the conventional manner, forced air cooling as the nuts move along a conveyor belt. These air spaces are not substantially filled during the application of "shine oil" after the nuts have cooled.

The principle underlying the present invention is the discovery that "spottiness," either naturally occurring in dehulled peanuts or produced by heating and drying steps in conventional processing techniques, can be substantially eliminated by reducing the volume of air spaces by penetration of the surface of the kernels with an edible liquid containing non-evaporating liquid or solid materials. The heating step of the invention tends to expand the air in existing air spaces and/or force steam from the peanut kernel.

Quenching of the heated peanuts results in penetration of a non-evaporating liquid into the peanut. Quenching involves rapid cooling of the hot kernels while preventing contact with air during the cooling period. After surrounding the surface of the peanut material with a non-evaporating liquid, condensation of water vapor due to cooling the peanut tissue creates a powerful suction which draws the surrounding liquid into the peanut tissue. The penetration thus achieved eliminates objectionable surface blemishes which cannot be hidden by the application of "shine oil" on cool nuts. The term "quenching" is intended to include full immersion of the hot peanuts in a bath of liquid and also washing or spraying of quenching liquid on to the total surface of each peanut kernel. Optional time periods for quenching vary with (a) the rate of heat transfer from the hot kernels to the quenching liquid; and (b) the combined volume of the steam escape channels and air spaces caused by growth defects.

The temperature of the peanut surfaces at the end of the quenching step should be below about 130° F. and preferably at or below room temperature. Final liquid temperatures below that of ambient air are preferred since the contraction of air and condensation of steam are accelerated and create a more powerful suction force. Also, it is desirable to have the vapor pressure of water in the interior portion of the peanut kernel at or below the vapor pressure of water at room temperature. The minimum liquid temperature is determined by the viscosity of the liquid which must be at a level to permit easy handling and also draining of the liquid from the cooled peanut. It is often desirable to externally cool the penetrating liquid to maintain liquid temperatures at desired levels without the necessity of utilizing large volume of liquid.

Suitable quenching liquids include: (1) one or more of any suitable edible vegetable oil, such as coconut, peanut, sesame, cottonseed, corn or palm oil, properly refined and/or partially or wholly hydrogenated; (2) one or more of any edible, refined animal fat, such as lard, hydrogenated lard and hydrogenated whale oil; and (3) any edible and non-objectionable additives, food materials and/or food adjuncts soluble in or emulsifiable with any of the vegetable and animal oils/fats under (1) and (2) and adapted to accomplish certain desirable results. Suitable additives include: mono and/or diglycerides of fatty acids; fat soluble antioxidants; refined lecithins; and flavoring compounds.

Fat-soluble antioxidants dissolved in the quenching oil/fat serve to protect the heated peanut oil within the kernels and the heated frying oil. The film of quenching liquid absorbed by the surfaces, which has not been degraded by heat, protects against the development of oxidative rancidity during the shelf-life of peanuts processed by the inventive method.

Fat-soluble, refined lecithins displaying certain antioxidant as well as hygroscopic properties also increase shelf-life while maintaining a moisture-equilibrium within the peanut kernels which in turn results in the preservation of the desired crispness or chewability and the prevention of excessive drying-out after air exposure of the final product.

Other additives belonging to the class of flavors and aroma producing compounds, which due to their sensitivity toward heat and their volatility and/or decomposition at peanut frying temperatures could not be added to the frying fats for dehulled peanuts before roasting may be incorporated into the cold quenching liquid. These additives may be used to impart certain desirable flavors and/or odors to roasted peanuts processed according to this invention. Similarly, certain fat-soluble vitamins (vitamins A, D, E ($\alpha$-tocopherol)) could serve to enhance and supplement the nutritional value of the final products.

Besides non-evaporating liquids, a group of water soluble, non-evaporating solids and/or liquids dissolved in water may be employed successfully for quenching purposes. The solids preferred and useful for this purpose should combine high water solubility with acceptability from the nutritional standpoint, salt (NaCl) representing at present the only inorganic compound of practical importance, although pure calcium sulfate, calcium chloride, disodium phosphate and other nutritionally important salts could be included in the list provided no undesirable influence upon the flavor of the final peanut product is exerted. Suitable water soluble solids include: sugars such as dextrose, fructose, maltose, lactose; sugars and dextrins and hydrolyzed starches contained in various corn syrups and invert sugar including honey; water-soluble organic humectants such as glycerol sorbitols, propylene glycol, etc., which can control crispness, hardness and chewability of peanuts quenched in such solutions; flavoring compounds, such as monosodium glutamate; and water soluble vitamins including ascorbic acid, vitamins of the B-complex such as riboflavin, nicotinic acid or amide, and vitamin B6.

When employing aqueous quenching baths, attention must be paid to the control of factors which might result in the reappearance of "spottiness" in the final products. Such reappearance has been observed when an insufficient amount of solids is dissolved in the acqueous base and an excess of water in the solution is "absorbed" during the quenching by the cooling kernels. It is desirable therefore to have the aqueous bath contain at least 40% solids or non-evaporating liquid by weight.

The following examples are intended to be illustrative of the process of the invention and are not intended to limit the scope thereof. Examples I–IV illustrate various causes of "spottiness."

Example I

Dehulled large Virginia peanuts kept for weeks in a loosely covered container and heated at 105°–110° C. for about 30 minutes for deskinning purposes showed after deskinning predominantly white blotches and spots characterized by shortage or absence of oil within the blotches and attributed to natural growth defects. Experimentally the shortage or absence of oil within the spots was demonstrated by the specific coloration of the latter by short immersion of the kernel in an aqueous solution of an organic substantive acid dye having no affinity for tissue impregnated with peanut oil such as the usual surface tissue of a deskinned peanut kernel.

Example II

The formation of less conspicuous blotches or blisters was observed after air-drying dehulled peanuts by heating at 200°±10° F. for 3⅙ and 4½ hours, respectively. The deskinned kernels in both cases showed white spots or blemishes. The fact that the extended heating periods did not increase the number or sizes of the spots indicates that they are not the result of dehydration and spotty extrusion of natural oil contained in the kernels' surfaces but rather due to growth defects and/or immaturity of peanuts and already present to a varying extent in non-processed dehulled peanuts used as raw material in commercial practice.

Example III

Very small, very poorly developed, immature peanuts rejected in commercial practice as off-flavored and waste, after very light dry-roasting by infra-red heat (which caused very little darkening in color), showed not only an extreme number of blisters or blotches such as observed in Examples I and II but in addition white spottiness over large surface areas. This spottiness proved to be removable much easier than spottiness due to growth defects, probably due to greater porosity of the surface areas after formation of air-filled steam escape channels.

Example IV

This example demonstrates experimental techniques employed in the laboratory which produce spottiness and reflects some of the difficulties actually encountered in conventional commercial peanut-processing.

(a) Heating of dehulled Virginia peanuts at 250° F. for 30 minutes has no roasting effect, but results in objectionable spottiness (white on creamy background) of the kernels.

(b) The preheated and deskinned peanuts obtained by treatment under (a) were deep fat fried at 300° F. for 12 minutes. A very pronounced increase in spottiness resulted.

(c) Heating of air-dried dehulled peanuts at 325°–350° F. for 20 minutes resulted in badly spotted deskinned kernels. Spottiness thus appears to increase with increasing roasting temperatures.

(d) Dehulled Virginia peanuts, boiled in water for 15 minutes and subsequently dried at 225° F. for 5 hours showed noticeable spottiness when deskinned.

Example V

The spotty, heat-treated, immature peanuts of Example III were heated in a bath of hydrogenated coconut oil at 290° F. for 5 minutes. The hot kernels after removal from the fat and a very short draining period (in seconds) were quenched for 20 minutes (complete immersion) in refined peanut oil which was precooled to 52° F. The temperature of the oil rose during this period to 75.2° F. The adhering oil was removed by drainage. Substantially all of the original spottiness was removed and did not return after 2 months storage.

Example VI

Deskinner, very spotty, dry roasted, brined peanuts with skins on were heated in a bath of hydrogenated coconut oil at about 320° F. for a few minutes and not removed from the bath which was rapidly cooled to room temperature. The quenched kernels appeared absolutely spotless which shows that "spottiness" independent of its cause may be removed by the quenching step.

Example VII

Air-dry dehulled Virginia peanuts (in no way selected) were heated at 137.7° C. in a gas oven for 15 minutes and after cooling to room temperature deskinned by hand. The deskinned kernels showed no spottiness. They were deep fat fried in hydrogenated coconut oil kept at 300° F. for 7 minutes. Maximal steam escape was observed after the first 2 minutes of frying while steam development appeared very moderate during the fourth to sixth minutes and negligible after 7 minutes. A small sample of the friend kernels displayed noticeable spottiness after being air-cooled on paper. The remaining hot roasted kernels were, after removal from the frying fat, immediately quenched for 30 seconds by positive immersion in fresh hydrogenated coconut oil cooled to 37.5° C., the temperature of the quenching bath rising during the 30 seconds quenching period to 490 C. The processed kernels were drained of excess fat and salted by rolling with 2% by weight of fine salt. The resulting product was of very desirable color and free of any spottiness after treatment and also after nearly 3 months storage.

Example VIII

Exactly 150 grams of the same dehulled peanuts used in Example VII were moistened with 4% by weight (6 g.) of water which was completely absorbed by the skins after 5 minutes. Fifteen minutes after addition of water, the moistened peanuts were heated as in Example VII on a tray at 137.7° C. for 15 minutes and deskinned by hand after cooling. All whole deskinned kernels were deep fat friend at 300° F. for 7 minutes. Strongest steam development was observed after 2 minutes, moderate steam development after 6 minutes and very moderate development at the end of the frying period. A small sample of the friend kernels, after air cooling, showed decided spottiness.

The major portion of hot friend kernels, after a very short draining period of less than 5 seconds, was immediately quenched by complete immersion for 20 seconds in fresh, hydrogenated coconut oil cooled to 27° C. The temperature of the quenching bath was raised to 42° C. The kernels were subsequently drained on a screen and salted with 2% fine salt. The yield amounted to 86.2% whole kernels and 13.8% splits. The final product appears absolutely spotless and displays the same desirable properties as Example VII as to color, flavor, crispness and chewability. Storage at room temperatures for nearly 3 months did not change these findings.

The absence of any suggestion of rancidity after extended storage at room temperature suggests that greatly increased shelf-life of salted roasted nuts may be obtained by the quenching step. By enveloping the kernels' surfaces with a thin layer of a fat or oil having a very high induction period which may be further increased by the incorporation of suitable anti-oxidants into it, rancidity of the oil absorbed during frying can be slowed down or prevented during storage periods.

Examples IX and X demonstrate the use of aqueous quenching baths, while Example XII illustrates the production of roasted kernels without spottiness by combining aqueous-base quenching with oil-base quenching.

Example IX

Dehulled Virginia peanuts, air-dried in a can during several weeks' storage, were roasted in a perforated basket in hydrogenated coconut oil at 310° F. for 7 minutes of frying tapered off to moderate steaming. The hot peanuts were removed from the oil, drained for a very short time (seconds) and quenched for 20 seconds by total immersion in an aqueous bath containing 36 grams NaCl/100 cc. The temperature of the solution rose to 94° F. The quenched peanuts, still noticeably warm were deskinned easily by hand, and the deskinned kernels were air-dried and very lightly salted with very fine salt. Due to the aqueous base of the quenching solution, very little oil adhered to the kernels' surfaces. The resulting air-dry, roasted and salted peanuts had desirable texture, color and flavor and were practically free of spottiness.

Significantly after a few weeks of storage, a noticeable amount of spottiness had developed resulting from the shortage of solids or liquids in the quenching solution. Water absorbed by peanuts during quenching evaporates during storage so it is essential to have at least 40% of non-evaporating material in the aqueous quenching bath. The final product showed no further deterioration of its quality after 3 months' storage at room temperature.

This example illustrates reappearance of spottiness during storage in the final products due to a low percentage of soluble solids and/or non-volatile liquid in an aqueous quenching bath. Re-entry of air into the tissue probably resulted.

Example X

Dehulled peanuts (Virginia, can-dry) were fried in hydrogenated coconut oil at 310° F. for 7 minutes and after very short drainage immediately quenched for 30 seconds in an aqueous solution of 5% glycerin and 1% monosodium glutamate in saturated salt solution. The total content of solids and non-volatile matter in said solution amounted to approximately 42 percent. The temperature of the quenching bath was raised from 55° F. to 75° F. The quenched peanuts were drained, deskinned, and the kernels were rolled in fine salt. The resulting final product showed only a few non-conspicuous spots and matched the quality of highest grade commercial products. No spotting developed during three months' storage.

Example XI

Air-dry dehulled Virginia peanuts were, for blanching purposes, wetted with about 4–5% by weight of a highly dilute, alkaline solution of secondary sodium phosphate. After about two weeks drying in air the peanuts were deskinned easily by hand as the skins had become very brittle.

The deskinned kernels were deep fat fried at 300° F. for six minutes, with steam development being observed during the whole frying period. The hot toasted kernels, were immediately quenched by complete immersion in a bath consisting of a saturated salt solution containing 5% glycerine and 2% sodium glutamate, i.e., a total of about 42.7% solids and non-volatile matter. The bath temperature was raised during the quenching period of ten seconds from 57.2° F. to 60.8° F. Due to this short quenching period the rather warm kernels showed many superficial white spots and blemishes. They were, without allowing them to cool, reheated in a gas oven at about 180° F. for 30 minutes.

By wetting (light spraying) the hot kernels with cooled peanut oil, all spottiness was completely removed. This spottiness could not be removed from fried peanuts which were air cooled and then coated with oil.

Subsequent salting of the quenched peanuts was unnecessary as quenching in salt solution had introduced a sufficient amount of salt into the kernels to permit elimination of the customary final salting step.

It becomes evident from the foregoing examples that the method disclosed may be varied in many ways to suit individual preference with regard to color, flavor, chewability and crispness without departing from the basic principles of the invention as set forth in the appended claims.

I claim:
1. In the processing of peanuts, a method for controlling objectionable whitish surface blemishes comprising: heating the peanuts to a temperature above the boiling point of water; and immediately quenching the heated peanuts in the absence of air by contacting all surfaces of the peanuts with an edible impregnating liquid to cool the peanuts to a temperature below the boiling point of water.

2. The method of claim 1 wherein the heating step comprises roasting the peanuts in an oil bath at a temperature from about 257° F. to about 375° F.

3. The method of claim 1 wherein the quenching step is accomplished by immersing the heated peanuts in an edible oil bath until cooled to a temperature below about 130° F.

4. The method of claim 3 wherein said liquid is peanut oil.

5. The method of claim 1 wherein the quenching step is accomplished by immersing the heated peanuts in an aqueous bath containing at least about 40 percent of an edible non-evaporating substance.

6. The method of claim 5 wherein the non-evaporating substance is selected from the group consisting of sugars, dextrins, starches, corn syrups, invert sugars, sodium chloride, water-soluble organic humectants, and mixtures thereof.

7. A method for eliminating undesirable surface blemishes on roasted peanuts caused by uneven oil distribution comprising rapidly cooling the roasted peanuts from a roasting temperature greater than the boiling point of water to a temperature below that of ambient air by contacting all surfaces of the peanuts with an edible impregnating liquid whereby said liquid is drawn into areas of low oil concentration.

8. The method of claim 7 wherein the peanuts are cooled by immersion in a liquid bath of an edible oil.

9. The method of claim 7 wherein the peanuts are cooled by immersion in an aqueous bath containing at least about 40 percent of an impregnating agent selected from the group consisting of sugars, dextrins, starches, corn syrups, invert sugars, sodium chloride and mixtures thereof.

10. The method of claim 7 wherein the impregnating liquid is peanut oil.

11. The method of claim 7 wherein the impregnating liquid is hydrogenated coconut oil.

References Cited
UNITED STATES PATENTS 1,908,059   5/1933   Sawin _____ 99—126
2,020,533  11/1935   Zaloom _____ 99—11

OTHER REFERENCES

Woodroof, "Peanuts: Production, Processing, Products," February 1966, p. 180.

LIONEL M. SHAPIRO, Primary Examiner

R. M. ELLIOTT, Assistant Examiner

U.S. Cl. X.R.
99—127